United States Patent
Matsunobu (10) Patent No.: US 8,493,414 B2
(45) Date of Patent: Jul. 23, 2013

(54) INFORMATION DISPLAY DEVICE AND RECORDING MEDIUM WITH CONTROL PROGRAM RECORDED THEREIN

(75) Inventor: Yutaka Matsunobu, Kanagawa (JP)

(73) Assignee: NEC Casio Mobile Communications, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 13/067,304

(22) Filed: May 23, 2011

(65) Prior Publication Data

US 2011/0292081 A1    Dec. 1, 2011

(30) Foreign Application Priority Data

May 26, 2010  (JP) ................................. 2010-120278

(51) Int. Cl.
G06T 11/00        (2006.01)

(52) U.S. Cl.
USPC ............................ 345/650; 345/655; 715/781

(58) Field of Classification Search
None
See application file for complete search history.

(56) References Cited

U.S. PATENT DOCUMENTS

| | | | |
|---|---|---|---|
| 6,326,978 B1 * | 12/2001 | Robbins ........................ | 345/654 |
| 2006/0274087 A1 * | 12/2006 | Kim et al. ..................... | 345/649 |
| 2009/0284463 A1 * | 11/2009 | Morimoto et al. ............ | 345/156 |
| 2010/0088532 A1 * | 4/2010 | Pollock et al. ................ | 713/324 |
| 2010/0182265 A1 * | 7/2010 | Kim et al. ..................... | 345/173 |
| 2010/0265269 A1 * | 10/2010 | Matsuda ....................... | 345/650 |
| 2011/0246618 A1 * | 10/2011 | Howard et al. ............... | 709/219 |

FOREIGN PATENT DOCUMENTS

JP  2005-274691 A  10/2005

* cited by examiner

Primary Examiner — Daniel Hajnik
Assistant Examiner — Andrew G Yang
(74) Attorney, Agent, or Firm — McGinn Intellectual Property Law Group, PLLC (57) ABSTRACT

In a terminal device, when application screens of a plurality of types of applications are being displayed individually and the display directions thereof differ from each other, a control section selects any one of the plurality of types of applications as a reference for display control, and orients the display direction of an application that is not the control reference to the display direction of an application that is the control reference. That is, when the display direction of an application displayed on one display section is changed from a vertical direction to a horizontal direction, the display direction of an application displayed on another display section is changed from the vertical direction to the horizontal direction so as to follow the foregoing change.

16 Claims, 9 Drawing Sheets

FIG. 3A APPLICATION TABLE

| APPLICATION | PRESENCE OF VERTICAL AND HORIZONTAL FORMS | DEFAULT DIRECTION | PRIORITY LEVEL |
|---|---|---|---|
| APPLICATION A | ○ | VERTICAL | 4 |
| APPLICATION B | × | HORIZONTAL | 1 |
| APPLICATION C | ○ | HORIZONTAL | 3 |
| APPLICATION D | ○ | VERTICAL | 2 |
| APPLICATION E | × | VERTICAL | 5 |
| | | | |

AT

FIG. 3B SETTING FLAG MEMORY

| 0 | PRIORITY LEVEL |
|---|---|
| 1 | EARLIEST |
| 2 | LATEST |

PF

FIG. 3C APPLICATION DISPLAY DIRECTION MEMORY

| APPLICATION A | HORIZONTAL |
|---|---|
| APPLICATION B | VERTICAL |

ROTATE A BY 180 DEGREES

FIG. 9B

IF PRIORITY LEVELS ARE A>B

FIG. 9C

INFORMATION DISPLAY DEVICE AND RECORDING MEDIUM WITH CONTROL PROGRAM RECORDED THEREIN

CROSS-REFERENCE TO RELATED APPLICATION

This application is based upon and claims the benefit of priority from the prior Japanese Patent Application No. 2010-120278, filed May 26, 2010, the entire contents of which is incorporated herein by reference.

BACKGROUND OF THE INVENTION

1. Field of the Invention

The present invention relates to an information display device that displays the application screens of a plurality of types of applications individually, and a recording medium with a control program for the information display device recorded therein.

2. Description of the Related Art

In recent years, information display devices such as mobile phones have become increasingly sophisticated, and the screen size has been increased along with it. However, the screen size is limited due to their portability, and therefore the increase of the screen size has been actualized by a plurality of display sections being provided. For example, in an information display device such as a mobile phone whose two housings are foldably connected via a hinge section, the increase of the screen size is actualized by a display section being provided in each housing and these two display sections being openable in a manner similar to a book.

Conventionally, as a technology for allocating information amounting to a plurality of pages to two display sections included in an openable type information display device such as this and displaying the information in the two display sections in a manner similar to a book, an electronic display device has been developed that is configured such that a direction in which the pages of an electronic book is displayed on each screen is controlled in accordance with a direction in which its housings are opened (refer to, for example, Japanese Patent Application Laid-Open (Kokai) Publication No. 2005-274691).

However, in the above described technology, when display processing is performed based on one application (app) and a page is allocated to each of a plurality of screens, whether information on each screen is displayed vertically or horizontally is determined based only on the common display specification of the application.

The information display devices such as mobile phones have various applications, such as an Internet browser application, an electronic mail application, and a television broadcast receiving application, and their users can run and view these applications simultaneously. However, because each application operates as an independent function, when these applications are initiated and displayed on separate screens, the display control of each screen is performed independently. Therefore, the display directions may differ with each screen, such as when the display direction of information displayed on the screen of one application is horizontal and the display direction of information displayed on the screen of another application is vertical. When the display directions differ with each screen as in the case just described, the displayed contents become difficult to view, and the user may misunderstand them. In addition, changing one of the display directions by user operation every time they are different places a large burden on the user.

SUMMARY OF THE INVENTION

An object of the present invention is to enable the display direction of information on application screens to coincide with each other when the application screens of a plurality of applications are individually displayed.

In accordance with one aspect of the present invention, there is provided an information display device that displays application screens for a plurality of types of applications individually, comprising: a judgment means for judging a display direction for each application screen; a selection means for selecting any one of the plurality of types of applications as a reference for display control, when the judgment means judges that the display direction of the application screens differs from each other; and a display control means for performing display control to orient the display direction of an application that has not been selected as the reference for display control to the display direction of an application that has been selected as the reference for display control by the selection means.

In accordance with another aspect of the present invention, there is provided a non-transitory computer-readable storage medium having stored thereon a program that is executable by a computer, the program being executable by the computer to perform functions comprising: processing for displaying application screens of a plurality of types of applications individually; processing for judging a display direction for each application screen; processing for selecting any one of the plurality of types of applications as a reference for display control, when judged that the display direction for each application screen differs from each other; and processing for performing display control to orient the display direction of an application that has not been selected as the reference for display control to the display direction of an application that has been selected as the reference for display control.

According to the present invention, the display directions of information on application screens coincide with each other when the application screens of a plurality of types of applications are individually displayed. As a result, the user-friendliness is improved.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiment shown in the accompanying drawings.

Figure 1A:
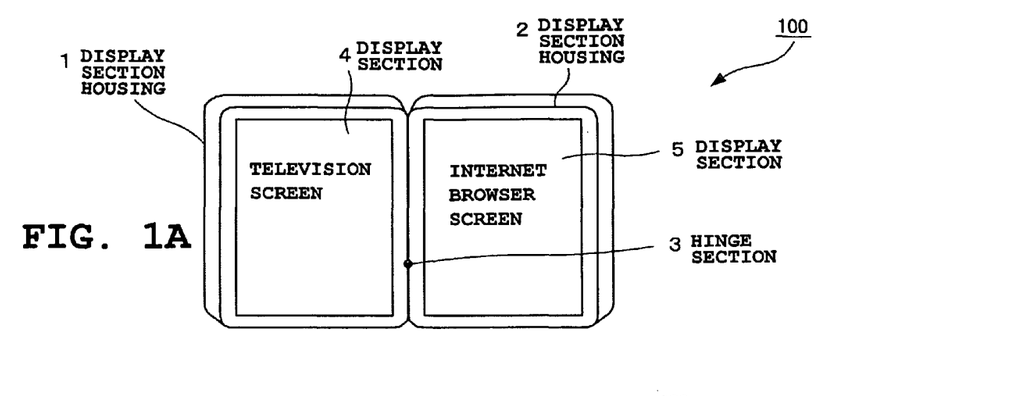
FIG. 1A to FIG. 1C are outer appearance views of a mobile phone 100 to which the present invention has been applied.
Figure 1B:
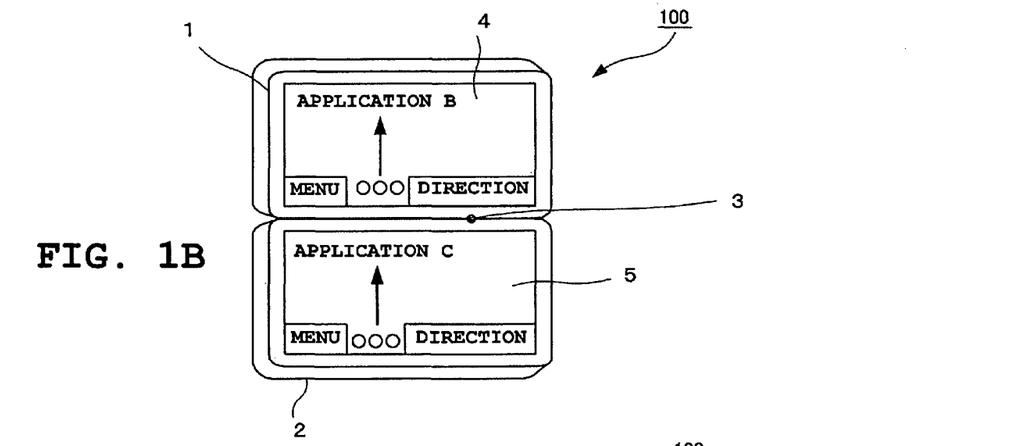
Figure 1C:
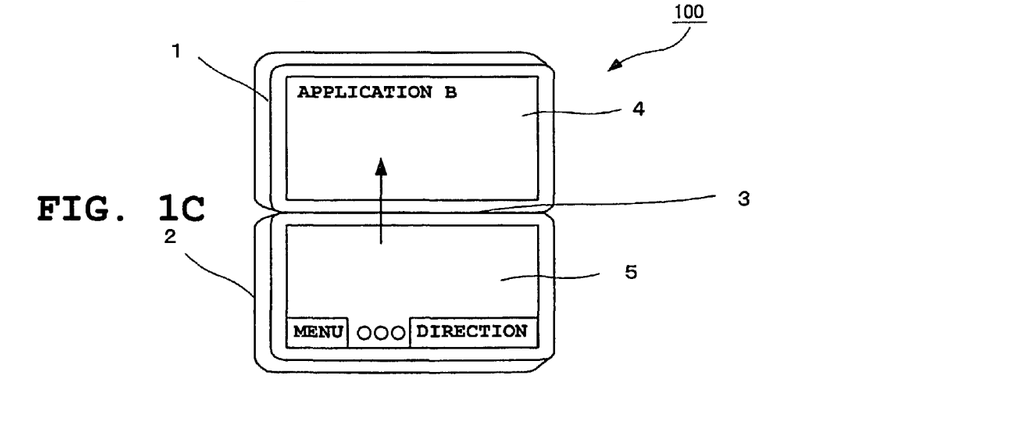

The present embodiment is an example in which the present invention has been applied to a mobile phone 100. FIG. 1A to FIG. 1C are outer appearance views of the mobile phone 100.

The mobile phone 100 has a call function, an electronic mail function, an Internet connection function (web access function), a television broadcast receiving function, an electronic book viewing function, etc. As shown in FIG. 1A to FIG. 1C, the mobile phone 100 is a foldable (openable) type mobile phone which includes two housings respectively having a display section that are a display section housing 1 and a display section housing 2 foldably connected (so as to be openable and closable) via a hinge section 3. The electronic book viewing function is a function that allocates data amounting to a plurality of pages to the respective display sections of the display section housings 1 and 2, and displays the data in the page sequence.

The display section housing 1 includes a display section 4, and the display section housing 2 includes a display section 5. These display section housings 1 and 2 are respectively composed of rectangular bodies of the same shape and size. The display sections 4 and 5, which are rectangular liquid crystal display sections or organic electroluminescent (EL) sections having the same shape and size, are arranged on substantially the overall front surfaces of the display section housings 1 and 2. Substantially the overall areas of the display sections 4 and 5 (physical display screens) respectively constitute a vertically long application screen with an uneven aspect ratio or a horizontally long application screen with an uneven aspect ratio, depending on whether the display sections 4 and 5 are vertically oriented or horizontally oriented. Each application screen is a physical display screen corresponding to the substantially overall area of the display section 4 or the display section 5. FIG. 1A shows an opened state where the vertically long display section housings 1 and 2 are horizontally aligned (horizontally opened state). In this horizontally opened state, the display section housing 1 is positioned on the left side and the display section housing 2 is positioned on the right side in FIG. 1A.

The hinge section 3 is a connecting section enabling the display section housings 1 and 2 to be openable and closable, by which they can be changed from an overlapped state to an opened state (a state in which the display section housings 1 and 2 are opened at substantially 180°). In this opened state, the display section 4 included in the display section housing 1 and the display section 5 included in the display section housing 2 are closely aligned horizontally, and each display section constitutes the vertically long application screen, as shown in FIG. 1A. In the example in FIG. 1A, two functions (applications [apps]) are running simultaneously in the two display sections 4 and 5 (the user is running and viewing two functions with separate display sections). That is, a television application is running in the display section 4 included in the display section housing 1 positioned on the left side in FIG. 1A, and an Internet browser application is running in the display section 5 included in the display section housing 2 positioned on the right side in FIG. 1A.

FIG. 1B shows an opened state where the horizontally long display section housings 1 and 2 are vertically aligned (vertically opened state). In this vertically opened state, the display section housing 1 is positioned on the upper side and the display section housing 2 is positioned on the lower side in FIG. 1B. In the example in FIG. 1B, two functions (applications) are running simultaneously in the two display sections 4 and 5 (the user is running and viewing two functions with separate display sections). That is, an application B is running in the display section 4 included in the display section housing 1 positioned on the upper side in FIG. 1B, and an application C is running in the display section 5 included in the display section housing 2 positioned on the lower side in FIG. 1B. Note that arrows in the display sections 4 and 5 indicate display directions in which information on the display sections 4 and 5 are displayed. In the example in FIG. 1B, an up arrow is indicating that the display direction is a vertical direction (the top edge of text is on the top, and the bottom edge is on the bottom).

As shown in FIG. 1B, the display section 4 included in the display section housing 1 and the display section 5 included in the display section housing 2 are closely aligned vertically, and each display section constitutes the horizontally long application screen. On the lower side of each application screen, "menu", "direction", and the like are displayed as operation icons. The "menu" operation icon indicates a menu icon (touch key) that gives an instruction for menu display. In addition, the "direction" operation icon indicates a display direction change icon (touch key) that is used to change the display direction of information displayed on the screen.

FIG. 1C shows an example in which the display sections 4 and 5 are being used as a single screen in the vertically opened state shown in FIG. 1B, and a single application (the application B in the example in FIG. 1C) is running in the screen. As shown in FIG. 1C, the overall display sections 4 and 5 are used as a screen for the application B. In this example as well, the display direction of information is a vertical direction (the top edge of text is on the top, and the bottom edge is on the bottom). In addition, "menu", "direction", and the like are being displayed as operation icons on the lower side of the application screen.

Figure 2:
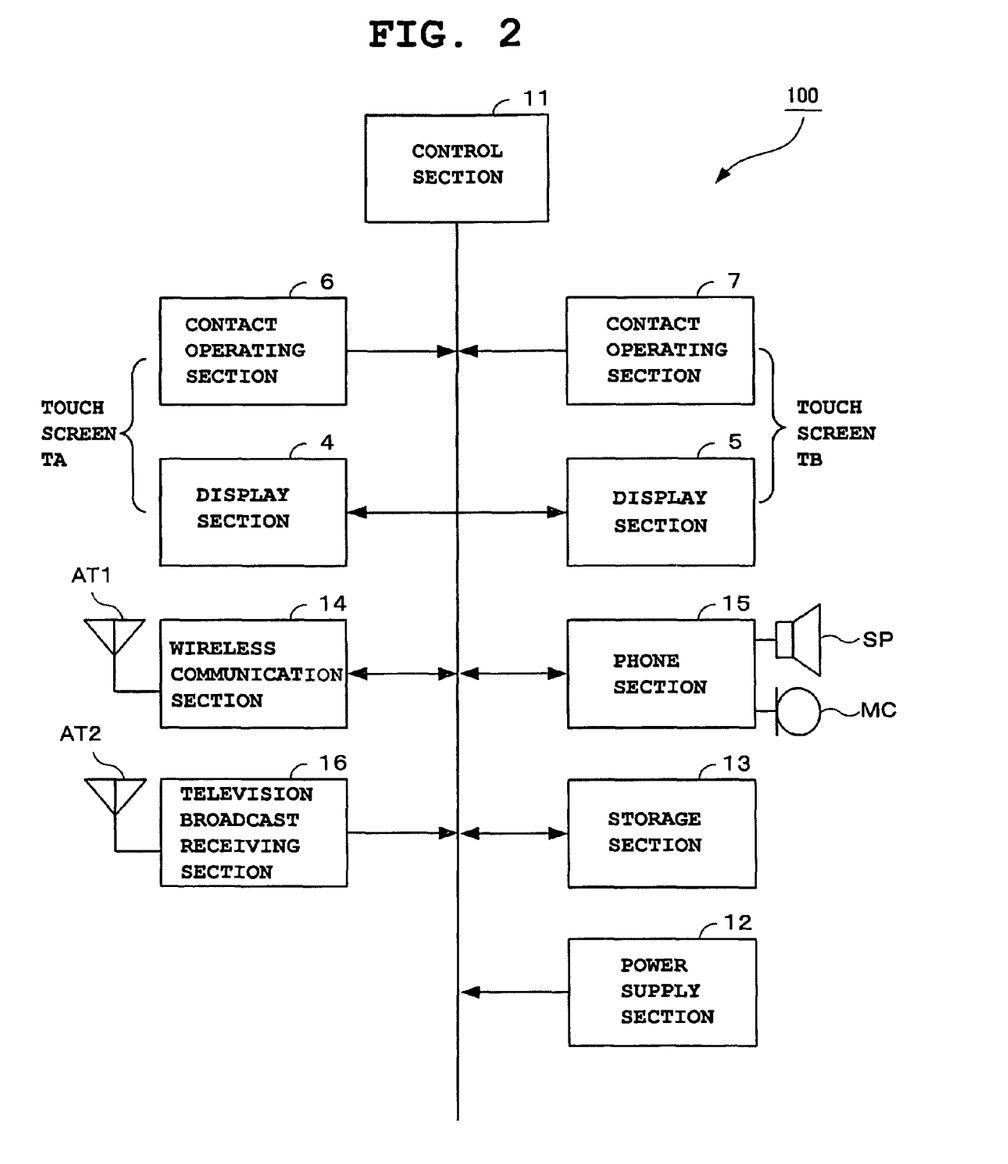
FIG. 2 is a block diagram showing basic components of the mobile phone 100.

FIG. 2 is a block diagram showing basic components of the mobile phone 100.

A control section 11 (judgment means, selection means, display control means, and changing means), which operates by receiving power supply from a power supply section 12 including a rechargeable battery, is provided with a central processing unit (CPU), a memory, and the like (not shown), and controls the overall operations of the mobile phone 100 in accordance with various programs stored in a storage section 13. The storage section 13 is an internal memory, such as a read-only memory (ROM) or a random access memory (RAM), and has a program area and a data area (not shown). The program area of the storage section 13 stores programs for actualizing the present embodiment based on operation procedures shown in FIG. 4 to FIG. 6 described hereafter, and the data area of the storage section 13 stores various flag information and various information required to operate the mobile phone 100. Note that the storage section 13 may be, for example, structured to include a detachable portable memory (recording media) such as a secure digital (SD) card or an integrated circuit (IC) card. Alternatively, the storage section 13 may be structured to be provided on a predetermined external server (not shown).

The display sections 4 and 5 constitute touch screens TA and TB, and the touch screens TA and TB are structured by contact operating sections (transparent touch panels) 6 and 7 being layered over the display sections 4 and 5. The contact operating sections 6 and 7 correspond to the surfaces of the display sections 4 and 5, and detect finger contact. Note that the touch panels 6 and 7 may use a capacitance method, a resistive film method, or a piezoelectric method that enables the detection of pressing (pressure) by an operating instrument or a finger, in addition to contact. In the present embodiment, the piezoelectric method, which enables the detection of pressure by an operating instrument (pen) or a finger, is used. The display sections 4 and 5 (touch screens TA and TB) are used to dial a number, enter text, enter a command, etc, and the control section 11 performs various types of processing, such as transmission processing and electronic mail processing, as processing based on operation signals sent from the touch screens TA and TB. In addition, the touch screens TA and TB display a standby screen image, icons, date and time information, text data, mail, web pages, and the like.

A wireless communication section 14 includes a wireless section, a baseband section, a demultiplexing section, and the like (not shown), and exchanges data with the nearest base station during the operation of, for example, the voice call function, the electronic mail function, or the Internet connection function. When the call function is running, the wireless communication section 14 receives signals from the receiving side of the baseband section, and after demodulating the signals into reception baseband signals, outputs the reception baseband signals as audio from a call speaker SP via a phone section 15. The wireless communication section 14 also receives, from the phone section 15, audio data inputted from a call microphone MC, and after encoding the audio data into transmission baseband signals, sends the encoded transmission baseband signals to the transmitting side of the baseband section, and transmits the encoded transmission baseband signals from an antenna AT1. A television broadcast receiving section 16 includes a receiving section (analog circuit section) and a digital circuit section, and receives terrestrial digital television broadcasts. The receiving section extracts broadcast signals from an antenna AT2. The digital circuit section demodulates received broadcast signals into orthogonal frequency-division multiplex (OFDM) signals; separates multiplexed broadcast signals into video, audio, and data (text data) signals and decodes the signals; or decompresses compressed data.

Figure 3A:
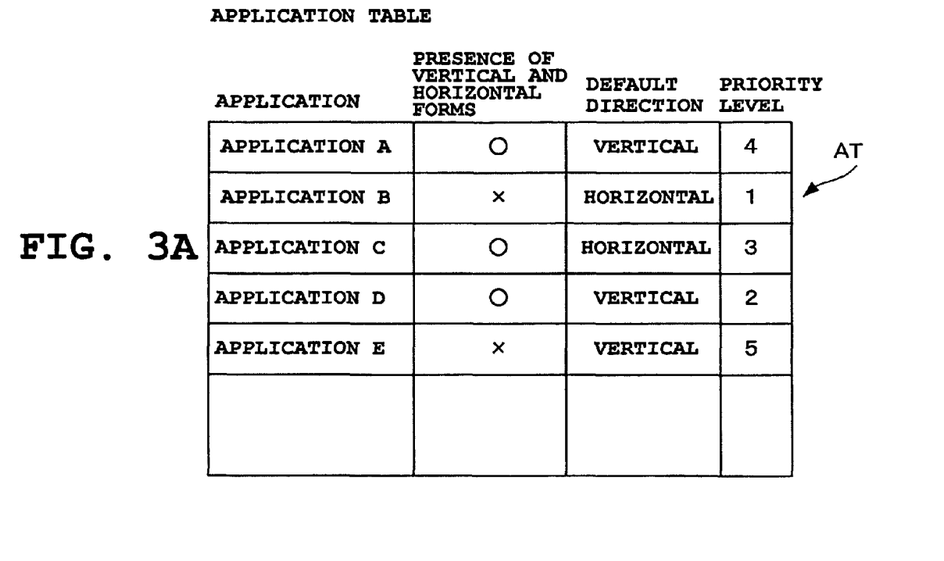
FIG. 3A to FIG. 3C are diagrams for explaining an application table AT, a setting flag memory PF, and an application display direction memory AD in a storage section 13.
Figure 3B:
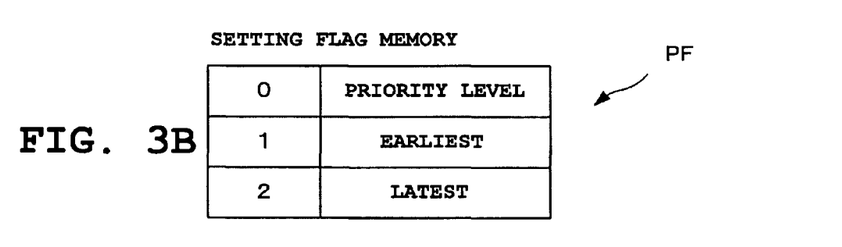
Figure 3C:
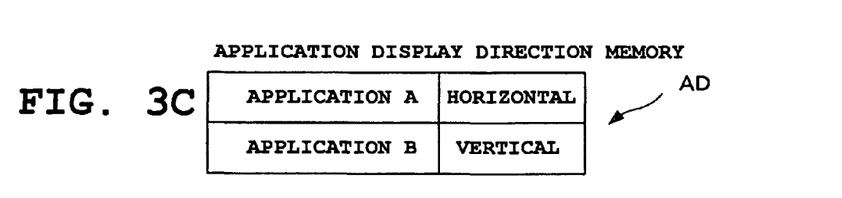

FIG. 3A to FIG. 3C are diagrams for explaining an application table AT, a setting flag memory PF, and an application display direction memory AD in the storage section 13.

The application table AT stores therein information related to display for each application. As shown in FIG. 3A, the application table AT has an "application" field, a "presence of vertical and horizontal forms" field, a "default direction" field, and a "priority level" field. The "application" field indicates an application name for identifying an application, and various application names such as "Internet browser application", "electronic mail application", and "television broadcast reception application" included in the mobile phone 100 are stored in this "application" field.

The "presence of vertical and horizontal forms" field indicates whether or not an application has both a vertically long screen configuration (vertical form) with an uneven aspect ratio and a horizontally long screen configuration (horizontal form) with an uneven aspect ratio which have been designed in advance. In FIG. 3A, "○" indicates that a corresponding application has both the vertical form in which the display direction of information displayed on a screen is a vertical direction and the horizontal form in which the display direction of information displayed on a screen is a horizontal direction. In addition, "x" indicates that a corresponding application has only one of either the vertical form or the horizontal form. When changing the display direction of an application such as this, if there is a difference between the aspect ratio of the screen configuration before the change and the aspect ratio of the screen configuration after the change, the control section 11 changes the screen configuration so that it accords with the aspect ratio after the change. That is, for example, when changing the display direction of an application having only the vertical form, the control section 11 performs display direction change processing, and changes the vertical form to the horizontal form. The "default direction" field indicates which of a vertical direction (vertical form) and a horizontal direction (horizontal form) is the default display direction (default screen form) of a corresponding application, and the "priority level" field indicates a priority level that is used when the control section 11 performs display control for orienting a display direction.

The display control for orienting a display direction is display control by which, when the display directions of information differ between the display section 4 and the display section 5 (application screens) and one of a plurality of types of currently running applications has been selected as a reference for display control, the display direction of information displayed on the screen of an application that is not the control reference is oriented to the display direction of information displayed on the screen of an application that is the control reference. When performing this display control, the control section 11 references the application table AT, and compares the priority levels decided for respective applications in order to select an application with a highest priority level as the above-described control reference.

The setting flag memory PF is a memory in which a method to be used is set among three types of methods for deciding the above-described control reference. As shown in FIG. 3B, the setting flag memory PF has "priority level", "earliest", and "latest" as the three types of deciding methods. When the value of the setting flag is "0", "priority level" is designated; when the value is "1", "earliest" is designated; and when the value is "2", "latest" is designated. In the method of "priority level", an application with a highest priority level is selected as a reference for display control, by the application table AT being referenced and the priority levels being compared. In the method of "earliest", the application that has been activated the earliest among a plurality of types of currently running applications is selected as a reference for display control. In the method of "latest", the application that has been activated the latest among a plurality of types of currently running applications is selected as a reference for display control.

The application display direction memory AD is a memory that temporarily stores the display directions of information displayed on the screens of a plurality of types of currently running applications. For example, FIG. 3C shows that the display direction of application A is a horizontal direction (horizontal form) and the display direction of application B is a vertical direction (vertical form). The contents of the application display direction memory AD are rewritten in response to changes in the display directions.

Next, an operation concept of the mobile phone 100 according to the present embodiment will be described with reference to flowcharts shown in FIG. 4 to FIG. 6. Each function described in the flowcharts is stored in a readable program code format, and operations in accordance with the program codes are sequentially performed in the mobile phone 100. Note that, in the mobile phone 100, operations in accordance with the program codes transmitted from a transmitting medium, such as a network, may be sequentially performed. That is, operations unique to the embodiment may be performed using programs and data provided from an external source via a transmitting medium, in addition to a recording medium.

Figure 4:
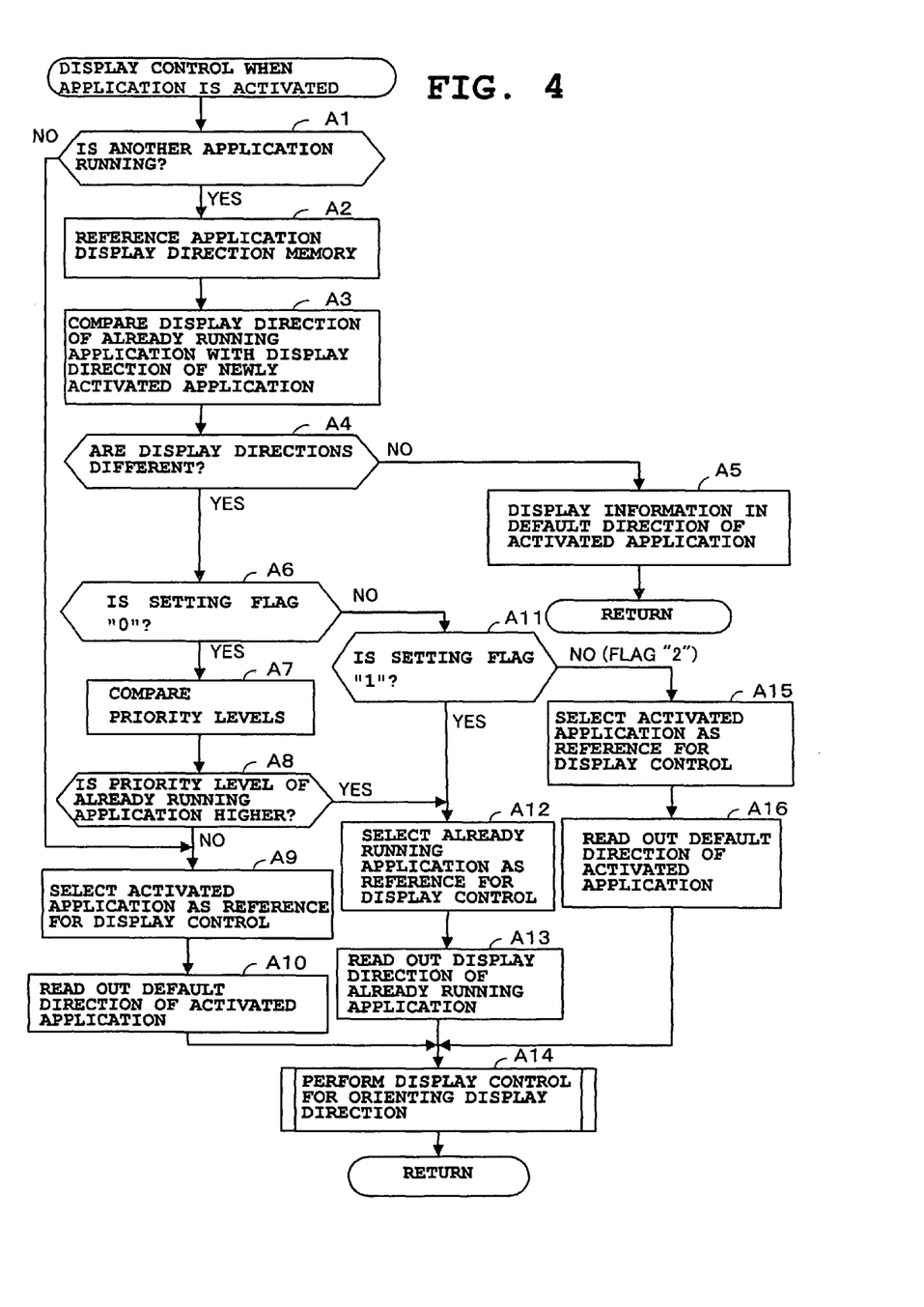
FIG. 4 is a flowchart showing display control processing when an application (app) is activated.
Figure 6:
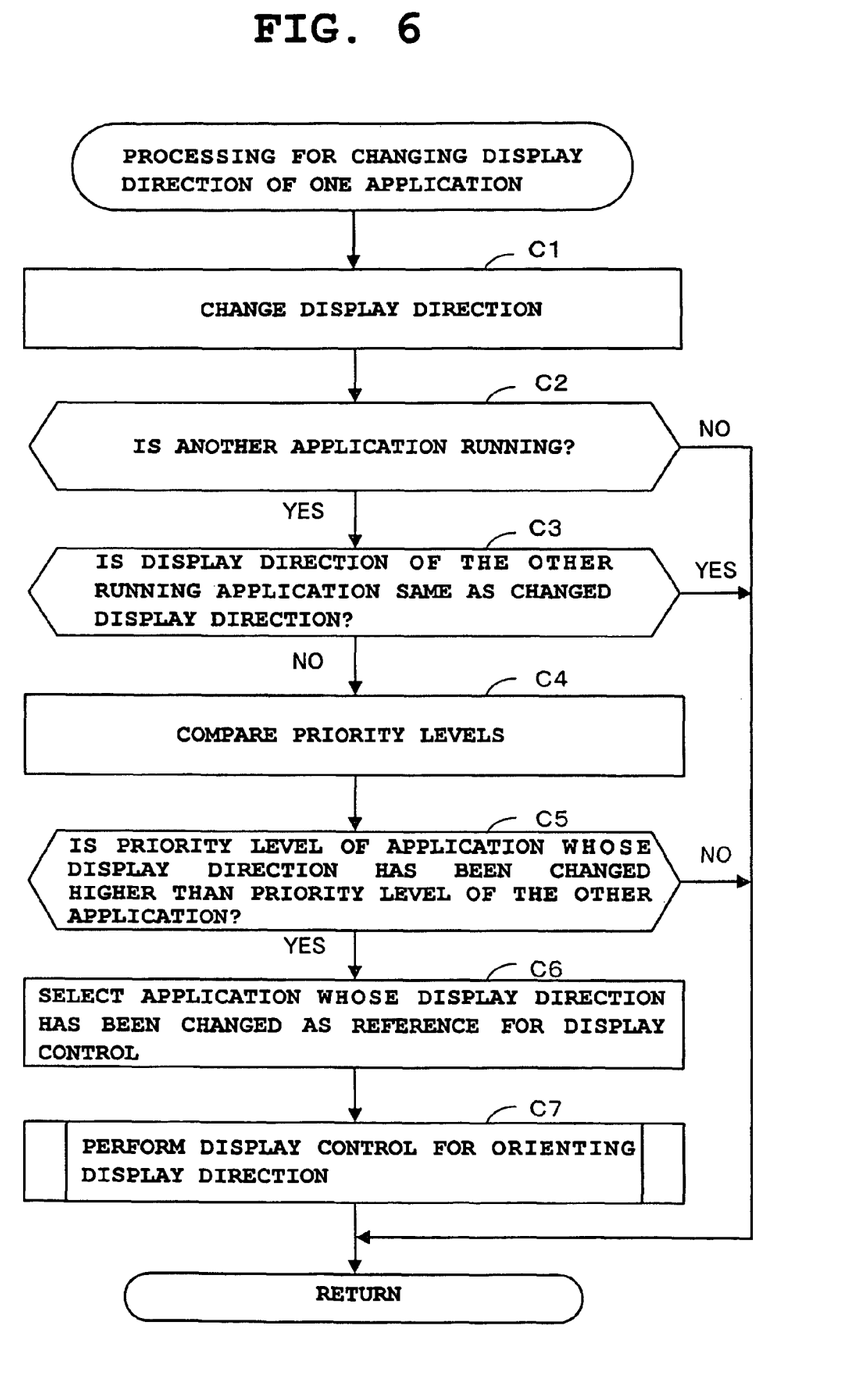
FIG. 6 is a flowchart showing processing for changing the display direction of one application.

FIG. 4 and FIG. 6 are flowcharts outlining operations of the characteristic portion of this embodiment from among all of the operations of the mobile phone 100. Note that, after exiting the flows in FIG. 4 and FIG. 6, the procedure returns to the main flow (not shown) of the overall operation.

FIG. 4 is a flowchart showing display control processing performed when an application is activated.

First, when a user operation to activate a new application is performed or when an activation command is issued by another application, the control section 11 initiates the display control processing in response, and judges whether or not another application is running (Step A1). When judged that another application is not currently running (NO at Step A1), the control section 11 selects this newly activated application as a reference for display control (Step A9), and reads out its default direction from the application table AT, as the display direction of the application selected as a control reference (Step A10). Then, based on the read display direction, the control section 11 performs display control for orienting the display direction of information for each application screen (Step A14). That is, the control section 11 performs display control for orienting the display direction of an application that is not a control reference to the display direction (the read display direction) of an application that is a control reference. In this instance, another application which is currently running does not exist, and therefore the control section 11 performs display control for setting the display direction of the newly activated application as default direction. Then, the control section 11 exits the flow in FIG. 4.

When judged that another application is running when the new application is activated (YES at Step A1), the control section 11 references the application display direction memory AD (Step A2), and after comparing the display direction of the already running application with the default direction of the newly activated application (Step A3), judges whether or not the display directions differ (Step A4). When judged that the display directions are the same (NO at Step A4), the control section 11 displays information on the screen of the newly activated application in its default direction (Step A5), and then exits the flow in FIG. 4.

When judged that the display direction of the already running application and the default direction of the newly activated application differ (YES at Step A4), the control section 11 references the setting flag memory PF and judges whether the value of the setting flag is "0" (Step A6), "1" or "2" (Step A11). When judged that the value of the setting flag is "0" (YES at Step A6), since it is a case where the method has been designated in which an application with a highest priority level is selected as a reference for display control from among priority levels associated with a plurality of types of currently running applications, the control section 11 proceeds to Step A7. Next, the control section 11 reads out the priority level associated with the already running application with reference to the application table AT, and compares it with the priority level of the newly activated application (Step A7).

Then, the control section 11 judges whether or not the priority level of the already running application is higher than the priority level of the newly activated application (Step A8). When judged that the priority level of the newly activated application is higher (NO at Step A8), the control section 11 selects the newly activated application as a reference for display control (Step A9), and reads out its default direction from the application table AT, as the display direction of the application selected as a control reference (Step A10). Then, based on the read display direction, the control section 11 performs display control for orienting the display direction of information for each application screen (Step A14). In this instance, the control section 11 performs display control for orienting the display direction of the already running application to the default direction which is the display direction of the newly activated application.

Conversely, when judged that the priority level of the already running application is higher than the priority level of the newly activated application (YES at Step A8), the control section 11 selects the already running application as a reference for display control (Step A12), and reads out its current display direction from the application display direction memory AD, as the display direction of the application selected as a control reference (Step A13). Then, based on the read display direction, the control section 11 performs display control for orienting the display direction of information for each application screen (Step A14). In this instance, the control section 11 performs display control for orienting the display direction of the newly activated application to the display direction of the already running application.

When judged that the value of the setting flag is "1" (YES at Step A11), since it is a case where the method has been designated in which an application that has been activated the earliest among a plurality of types of currently running applications is selected as a reference for display control, the control section 11 proceeds to Step A12. Next, the control section 11 selects the already running application as a reference for display control (Step A12), and reads out its current direction from the application display direction memory AD, as the display direction of the application selected as a control reference (Step A13). Then, based on the read display direction, the control section 11 performs display control for orienting the display direction of information for each application screen (Step A14). In this instance, the control section 11 performs the display control for orienting the display direction of the newly activated application to the display direction of the already running application.

When the value of the setting flag is "2" (NO at Step A11), since it is a case where the method has been designated in which an application that has been activated the latest among a plurality of types of currently running applications is selected as a reference for display control, the control section 11 proceeds to Step A15. Next, the control section 11 selects the newly activated application as a reference for display control (Step A15), and reads out its default direction from the application table AT, as the display direction of the application selected as a control reference (Step A16). Then, based on the read display direction, the control section 11 performs display control for orienting the display direction of information for each application screen (Step A14). In this instance, the control section 11 performs display control for orienting the display direction of the already running application to the default direction which is the display direction of the newly activated application.

Figure 5:
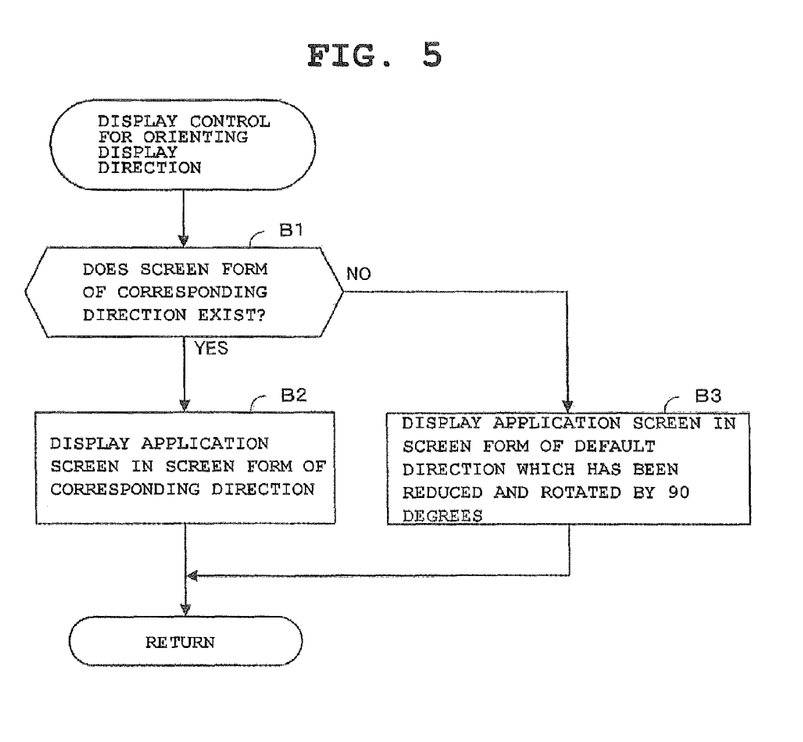
FIG. 5 is a flowchart detailing display control (Step A14 in FIG. 4 and Step C7 in FIG. 6) for orienting the display direction of information which is performed for each application screen.

FIG. 5 is a flowchart detailing the display control (such as Step A14 in FIG. 4) for orienting the display direction of information for each application screen.

In order to orient the display direction of another application to the display direction (a read display direction) of an application that is a control reference, first, the control section 11 references the application table AT, and judges whether or not a screen form corresponding to the display direction of the reference for display control exists, based on the "presence of vertical and horizontal forms" and the "default direction" associated with the other application (Step B1).

Figure 8A:
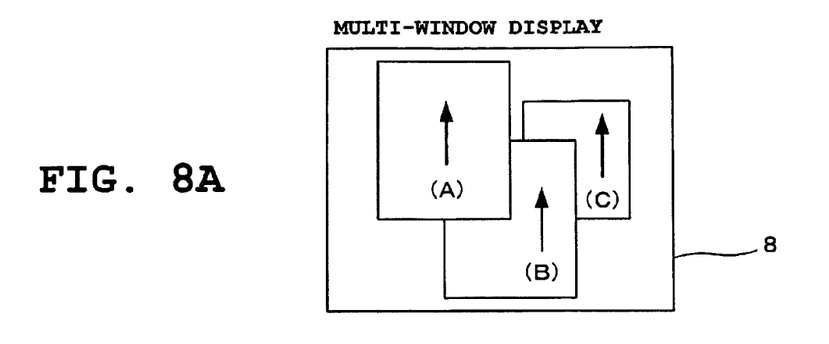
FIG. 8A to FIG. 8C are diagrams showing a variation example of the present embodiment, in which the application screens are software screens (window screens)
Figure 8B:
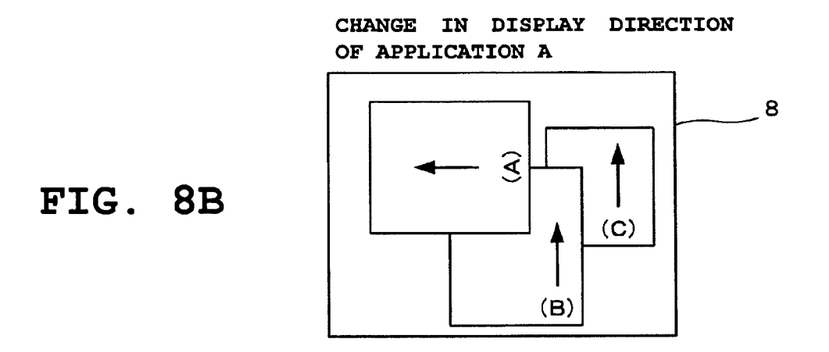
Figure 8C:
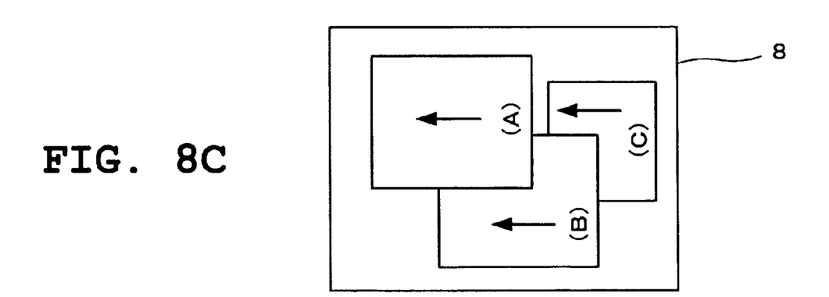

In the example in FIG. 3A, application A has both the vertical form and the horizontal form as shown in the application table AT. However, application B has only the horizontal form, which is its "default direction". Therefore, when the display direction of the control reference is a vertical direction and if the other application is application A, the control section 11 judges that the screen form of the corresponding direction exists (YES at Step B1), and displays the screen of application A in the screen form of the corresponding direction (vertical form) (Step B2). If the other application is application B, the control section 11 judges that the screen form of the corresponding direction does not exist (NO at Step 81), and visually orients the screen of application B to the corresponding direction by reducing the size of the overall screen form of the "default direction" of application B and rotating the reduced screen form by 90 degrees (Step B3). FIG. 8A to FIG. 8C show display examples of when the size of the overall screen form is reduced and the reduced screen form is rotated. As shown in FIG. 8A to FIG. 8C, the overall horizontal form is reduced such that the horizontal width thereof fits within the vertical width of the vertical form, and then rotated by 90 degrees, thereby being changed to the vertical form visually.

FIG. 6 is a flowchart showing processing for changing the display direction of one application.

The display direction changing processing is initiated when an instruction to change the display direction of any application is given by user operation. It is also initiated in response to a display control command issued along with the running of the application.

First, when an instruction to change the display direction of any application is given, the control section 11 changes the display direction based on the instruction and stores the changed display direction in association with the corresponding application in the application display direction memory AD (Step C1).

Figure 7A:
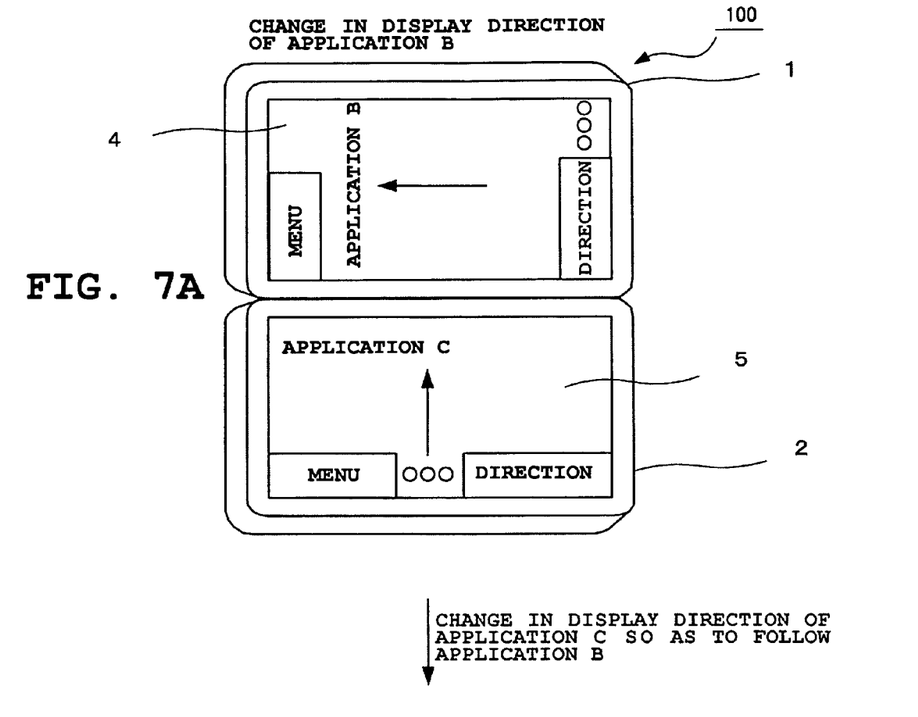
FIG. 7A and FIG. 7B are diagrams showing a display state when a display direction is changed to a horizontal direction.

That is, when changing the display direction of any application, if there is a difference between the aspect ratio of the screen configuration before the change and the aspect ratio of the screen configuration after the change, the control section 11 changes the screen configuration so that it accords with the aspect ratio after the change. When rotating the screen form by 90 degrees for example, the control section changes the display direction from vertical to horizontal or from horizontal to vertical. FIG. 7A shows an example in which the display direction of application B displayed on the upper display section 4 has been changed from a vertical direction to a horizontal direction, in the vertically opened state shown in FIG. 1B. Note that the arrow in the horizontal direction in FIG. 7A indicates that the display direction is the horizontal direction.

When the display direction of any application is changed in this way, the control section 11 judges whether or not another application is running (Step C2). When judged that another application is running (YES at Step C2), the control section 11 judges whether or not the display direction of this running application is the same as the changed display direction (Step C3). When judged that another application is not running (NO at Step C2) or, even when another application is running, when judged that both display directions are the same (YES at Step C3), the display control for orienting the display direction of information is not required to be performed, and therefore the control section 11 exits the flow in FIG. 6 at this point.

When the changed display direction and the display direction of the other application differ (NO at Step C3), the control section 11 compares the priority levels respectively stored in association with the currently running applications with reference to the application table AT (Step C4), and judges whether or not the priority level of the application whose display direction has been changed is higher than the priority level of the other application (Step C5). When judged that the priority level of the application whose display direction has been changed is lower than the priority level of the other application (NO at Step C3), since the display control for orienting the display direction of information is not required to be performed, the control section 11 exits the flow in FIG. 6 at this point.

Figure 7B:
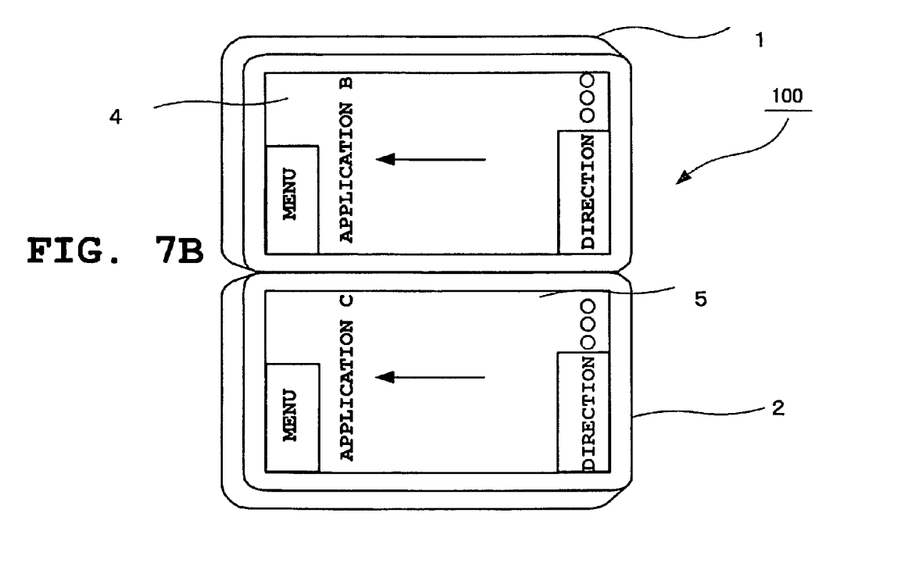

When judged that the priority level of the application whose display direction has been changed is higher than the priority level of the other application (YES at Step C5), the control section 11 selects the application whose display direction has been changed as a reference for display control (Step C6) and performs the display control to orient the display direction of information by changing the display direction of the other application to the display direction (the changed display direction) of the application that is the control reference (Step C7). FIG. 7B shows a display state when the display direction of application B displayed on the upper display section 4 is changed from a vertical direction to a horizontal direction as shown in FIG. 7A, and the display direction of application C displayed on the lower display section 5 is changed from the vertical direction to the horizontal direction following the change of the display direction of application B.

Note that the display control at Step C7 in FIG. 6 is also performed in accordance with the flowchart in FIG. 5. The control section 11 first references the application table AT, and judges whether or not a screen form corresponding to the display direction of the reference for display control exists, based on the "presence of vertical and horizontal forms" and the "default direction" associated with the other application (Step B1). Then, when judged that the screen form of the corresponding direction exists (YES at Step B1), the control section 11 displays the screen of application C in the screen form of the corresponding direction (Step B2). When judged that the screen form of the corresponding direction does not exist (NO at Step B1), the control section 11 visually orients the screen of application C to the corresponding direction by reducing the size of the overall screen form of the "default direction" of the application C and rotating the reduced screen form by 90 degrees (Step B3).

As described above, in the present embodiment, when the application screens of a plurality of types of applications are individually displayed, and the display directions of information thereon differ with each application screen, the control section 11 selects one of the plurality of types of applications as a reference for display control, and orients the display direction of an application that is not the control reference to the display direction of the application that is the control reference. Therefore, the display directions of information on application screens coincide with each other, and as a result the user-friendliness is improved.

Also, in the present embodiment, an application that has been activated the earliest among a plurality of types of applications can be selected as a reference for display control.

Therefore, the display direction of an application that has been activated later can be oriented to the display direction of the application that has been activated the earliest.

In addition, an application that has been activated the latest among a plurality of types of applications can also be selected as a reference for the display control. Therefore, the display direction of an application that has been activated earlier can be oriented to the display direction of the application that has been activated the latest.

Moreover, an application with a highest priority level can be selected as a reference for display control from among a plurality of types of applications, by the comparison of priority levels decided for the respective applications. Therefore, regardles of order in which applications are activated, the display direction of an application with a lower priority level can be oriented to the display direction of an application with a highest priority level.

Furthermore, in the present embodiment, the judgment of a display direction is performed on the condition that another application is already running when a new application is activated. Therefore, the judgment can be performed at an appropriate timing, and as a result the judgment of a display direction at an unnecessary timing can be prevented.

Still further, when the display direction of one of applications is changed, and the display direction after the change and the display direction of the other application differ, priority levels decided for the respective applications are compared. Then, when the priority level of the application whose display direction has been changed is higher than the priority level of the other application, the application whose display direction has been changed is selected as a reference for display control. Therefore, in the present embodiment, the display direction of another application can be oriented to the display direction of an application whose display direction has been changed.

Yet still further, the display direction of an application is changed in response to a change operation by user operation or a display control command issued along with the running of the application. Therefore, display directions can be changed automatically, in addition to operation by the user.

Yet still further, when changing the display direction of one of a plurality of types of applications having a vertically long application screen configuration or a horizontally long application screen configuration with an uneven aspect ratio which has been designed in advance, if the aspect ratio of the screen configuration after the change differs from that before the change, the control section 11 changes the screen configuration so that it accords with the aspect ratio after the change. Accordingly, even when an application whose display direction is to be changed has only one of either a vertically long application screen or a horizontally long application screen, its vertically long application screen can be changed to a horizontally long application screen, or its horizontally long application screen can be changed to a vertically long application screen.

Yet still further, the display sections 4 and 5, which are respectively included in the display section housings 1 and 2 constituting the mobile phone 100, are vertically long application screens with uneven aspect ratios or horizontally long application screens with uneven aspect ratios. Accordingly, the user can use the substantially overall areas of the display sections 4 and 5 (physical display screens) as vertically long application screens or horizontally long application screens by setting the mobile phone 100 in an opened state where the display sections 4 and 5 are horizontally aligned (horizontally opened state) or in an opened state where the display sections 4 and 5 are vertically aligned (vertically opened state).

As described above, when changing the display direction of an application in the present embodiment, the control section rotates the display direction by 90 degrees such as from vertical to horizontal, or from horizontal to vertical. However, the control section 11 may rotate the display direction by 180 degrees. In other words, the control section 11 may invert the display direction. For example, when the display direction is a vertical direction, the control section 11 may invert the display direction to the opposite direction (the top edge of text is on the bottom, and the bottom edge is on the top) in relation to its normal direction (the top edge of text is on the top, and the bottom edge is on the bottom), or may invert the display direction from the opposite direction to the normal direction. Similarly, when the display direction is a horizontal direction, the control section 11 may invert the display direction to the opposite direction (the top edge of text is on the right, and the bottom edge is on the left) in relation to its normal direction (the top edge of text is on the left, and the bottom edge is on the right), or may invert the display direction from the opposite direction to the normal direction.

In addition, the overall areas of the display sections 4 and 5 (physical display screens) respectively constitute a vertically long application screen or a horizontally long application screen in the above-described embodiment. However, these application screens are not limited to physical display screens, and may be software screens (window screens) such as those shown in FIG. 8A to FIG. 8C and FIG. 9A to FIG. 9C. For example, the application screens of a plurality of types of applications may be a plurality of window screens simultaneously displayed on a single display section.

FIG. 8A to FIG. 8C show an example of when application screens are software screens (window screens). FIG. 8A shows a multi-window display in which application screens for application A, application B, and application C are simultaneously displayed on a single display section 8. In FIG. 8A, the display direction of each application screen is a vertical direction (normal direction), or in other words, a display direction in which the top edge of text is on the top and the bottom edge is on the bottom. FIG. 8B shows an example in which the display direction of the application screen of application A is changed from the state shown in FIG. 7A to the horizontal direction (normal direction), or in other words, a direction in which the top edge of text is on the left and the bottom edge is on the right. FIG. 8C shows a state in which the display directions of other applications B and C are changed so as to follow the change in the display direction of application A shown in FIG. 8B. In other words, when application A is activated the earliest or the latest among these applications, or when the priority levels of applications A, B, and C are A>B>C, display control is performed to orient the display directions of other applications B and C to the display direction of application A, as shown in FIG. 8C. As a result, the display directions of applications B and C are changed from the vertical direction (normal direction) to the horizontal direction (normal direction).

Figure 9A:
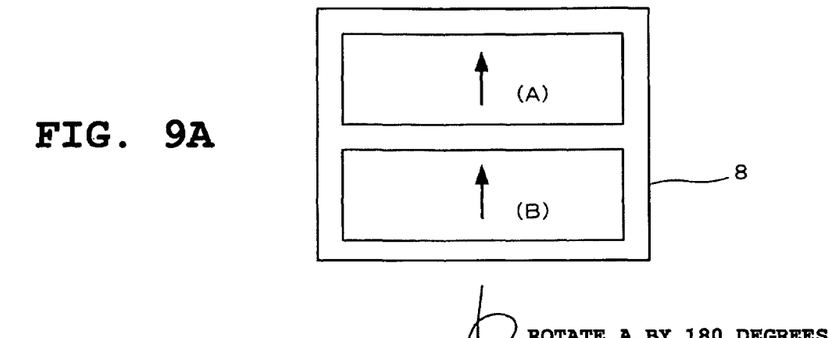
FIG. 9A to FIG. 9C are diagrams showing another variation example of the present embodiment, in which the application screens are software screens (window screens).
Figure 9B:
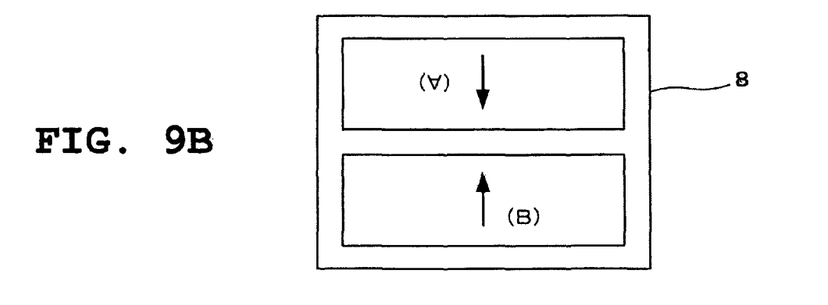
Figure 9C:
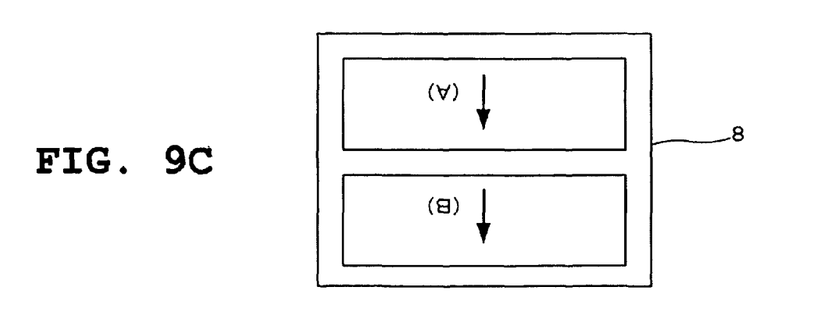

FIG. 9A to FIG. 9C show another example of when application screens are software screens (window screens). FIG. 9A shows a multi-window display in which the application screens of application A and application B are simultaneously displayed on a single display section 8. In FIG. 9A, the display direction of each application screen is a vertical direction (normal direction). FIG. 9B shows an example in which the display direction of the application screen of application A is changed from the state shown in FIG. 9A to another vertical direction (opposite direction), or in other words, a display direction in which the top edge of text is on the bottom and the bottom edge is on the top. FIG. 9C shows a state in which the display direction of the other application B is changed so as to follow the change in the display direction of the application screen of application A. In other words, when the application A is activated the earliest or the latest among these applications, or when the priority levels of applications A and B are A>B, display control is performed to orient the display direction of the other application B to the display direction of application A. As a result, the display direction of application B is changed from the vertical direction (normal direction) to the other vertical direction (opposite direction) as shown in FIG. 9C.

When application screens are software screens (window screens) as described above, the user-friendliness is further improved, and a higher practical effect can be acquired.

In the above-described embodiments, the present invention has been applied to a foldable-type mobile phone. However, the housing structure of the mobile phone is not limited thereto, and an optional housing structure such as a double-axis hinged-type, a sliding-type, or a rotating-type may be used. In addition, the present invention may be applied not only to a mobile phone but also to a personal computer, a personal digital assistant (PDA), a digital camera, a music player, etc.

In addition, the "devices" or the "units" described in each of the above-described embodiments are not required to be in a single housing, and may be separated into a plurality of housings by function. In addition, the steps in the above-described flowcharts are not required to be processed in time series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An information display device that displays application screens for a plurality of types of applications individually, said information display device comprising:
   storage means for storing information related to a display for each application;
   judgment means for judging a display direction for each application screen;
   detection means for detecting a preset method from among a plurality of methods for deciding a reference for a display control when the judgment means judges that the display direction for the application screens differs from each other;
   selection means for selecting one of the plurality of types of applications as a reference for the display control according to the preset method detected by the detection means and the information related to the display for each application stored by the storage means;
   display control means for performing the display control to orient a display direction of an application that has not been selected as the reference for the display control to a display direction of an application that has been selected as the reference for the display control by the selection means; and
   changing means for changing the display direction of any application among the plurality of types of applications,
   wherein the judgment means performs the judging of a display direction when the display direction of any application is changed by the changing means while application screens of a plurality of already running applications are being displayed simultaneously,
   wherein the plurality of types of applications comprise a vertically long application screen configuration with an uneven aspect ratio or a horizontally long application screen configuration with an uneven aspect ratio which have been designed in advance,
   wherein the changing means changes a screen configuration of an application whose display direction is changed such that, when an aspect ratio of the screen configuration before the display direction is changed differs from an aspect ratio of the screen configuration after the display direction is changed, the screen configuration accords with the aspect ratio after the display direction is changed, and
   wherein, when an application whose display direction is changed is devoid of a screen configuration that accords with the aspect ratio after the display direction is changed, the changing means reduces a size of the overall screen configuration before the display direction is changed and then rotates a reduced screen configuration to the display direction that is changed.

2. The information display device according to claim 1, wherein the preset method has been designated in which the selection means selects an application that has been activated earliest among the plurality of types of applications as the reference for the display control.

3. The information display device according to claim 1, wherein the preset method has been designated in which the selection means selects an application that has been activated latest among the plurality of types of applications as the reference for the display control.

4. The information display device according to claim 1, wherein the preset method has been designated in which the selection means compares priority levels decided for respective applications, and selects an application with a highest priority level as the reference for the display control, from among the plurality of types of applications.

5. The information display device according to claim 1, wherein the judgment means performs the judgment of a display direction on a condition that another application is already running when a new application is activated.

6. The information display device according to claim 1, wherein the selection means compares priority levels decided for respective applications when the display direction of any application is changed by the changing means and the display direction after being changed differs from a display direction of an application whose display direction has not been changed, and selects an application whose display direction has been changed as the reference for the display control on a condition that a priority level of the application whose display direction has been changed is higher than a priority level of the application whose display direction has not been changed.

7. The information display device according to claim 1, wherein the changing means changes the display direction of any application in a response to a change operation by a user operation or a display control command issued along with running of the application.

8. The information display device according to claim 1, further comprising:
   a display section provided in each of a plurality of housings constituting the information display device,
   wherein the display section provided in each of the plurality of housings comprises a vertically long application screen with an uneven aspect ratio or a horizontally long application screen with an uneven aspect ratio.

9. The information display device according to claim 1, wherein the application screens of the plurality of types of applications comprise window screens that are simultaneously displayed on a display section.

10. The information display device according to claim 1, wherein said detecting the preset method comprises choosing a method from among the plurality of methods for deciding the reference for the display control.

11. The information display device according to claim 1, wherein the plurality of methods for deciding the reference for the display control comprises a priority level method, an earliest method, and a latest method.

12. The information display device according to claim 11, wherein in the priority level method, an application with a highest priority level from among the plurality of types of applications is selected as the reference for the display control,
  wherein in the earliest method, an application that has been activated earliest among the plurality of types of applications is selected as the reference for the display control, and
  wherein in the latest method, an application that has been activated latest among the plurality of types of applications is selected as the reference for the display control.

13. A non-transitory computer-readable storage medium having stored thereon a program that is executable by a computer, the program being executable by the computer to perform functions comprising:
  display processing for displaying application screens of a plurality of types of applications individually;
  storage processing for storing information related to a display for each application;
  judgment processing for judging a display direction for each application screen;
  detection processing for detecting a preset method from among a plurality of methods for deciding a reference for a display control when judged that the display direction for each application screen differs from each other;
  selection processing for selecting one of the plurality of types of applications as a reference for the display control according to the preset method detected by the detection processing and the information related to the display for each application stored by the storage processing;
  display control processing for performing the display control to orient a display direction of an application that has not been selected as the reference for the display control to a display direction of an application that has been selected as the reference for the display control; and
  changing processing for changing the display direction of any application among the plurality of types of applications,
  wherein the judgment processing performs the judging of a display direction when the display direction of any application is changed by the changing processing while application screens of a plurality of already running applications are being displayed simultaneously,
  wherein the plurality of types of applications comprise a vertically long application screen configuration with an uneven aspect ratio or a horizontally long application screen configuration with an uneven aspect ratio which have been designed in advance,
  wherein the changing processing changes a screen configuration of an application whose display direction is changed such that, when an aspect ratio of the screen configuration before the display direction is changed differs from an aspect ratio of the screen configuration after the display direction is changed, the screen configuration accords with the aspect ratio after the display direction is changed, and
  wherein when an application whose display direction is changed is devoid of a screen configuration that accords with the aspect ratio after the display direction is changed, the changing processing reduces a size of the overall screen configuration before the display direction is changed and then rotates a reduced screen configuration to the display direction that is changed.

14. The non-transitory computer-readable storage medium according to claim 13, wherein said detecting the preset method comprises choosing a method from among the plurality of methods for deciding the reference for the display control.

15. The non-transitory computer-readable storage medium according to claim 13, wherein the plurality of methods for deciding the reference for the display control comprises a priority level method, an earliest method, and a latest method.

16. The non-transitory computer-readable storage medium according to claim 15, wherein in the priority level method, an application with a highest priority level from among the plurality of types of applications is selected as the reference for the display control,
  wherein in the earliest method, an application that has been activated earliest among the plurality of types of applications is selected as the reference for the display control, and
  wherein in the latest method, an application that has been activated latest among the plurality of types of applications is selected as the reference for the display control.

* * * * *